United States Patent Office 3,075,983
Patented Jan. 29, 1963

3,075,983
N-CARBAMYLOXYALKYL BARBITURATES
Philippe Gold-Aubert, Geneva, Switzerland, assignor to Sapos S.A., Geneva, Switzerland, a Swiss body corporate
No Drawing. Filed Nov. 21, 1960, Ser. No. 70,409
Claims priority, application Great Britain Nov. 23, 1959
2 Claims. (Cl. 260—256.4)

This invention is concerned with improvements in, or relating to, new compounds of use in therapy.

As is known, many derivatives of barbituric acid, commonly known as barbiturates, have a sedative and soporific action. The toxicity of these compounds is, however, in many cases, quite high which means that large doses cannot safely be given or that undesired side effects may occur on administration. Ideally, a sedative or soporific drug should have as high a therapeutic ratio (that is the ratio of therapeutic activity to toxicity) as possible so that large doses can safely be given if required, and so that the administration of moderate doses does not give appreciable side effects.

We have now found that compounds of the general Formula I set out below have in general a considerably higher therapeutic ratio than known barbiturates, for example phenobarbitone, as they possess high therapeutic activity for example as anticonvulsants but a very low toxicity. The new compounds can be used in medicine for the purposes for which barbiturates have hitherto been used; they are thus excellent sedative and tranquillizing drugs, and in general possess anti-convulsant action making them suitable for use in the treatment of epilepsy.

According to the invention, therefore, we provide as new compounds, compounds of the general formula:

I in which $R_1$ and $R_2$, which may be the same or different represent halogen atoms or a group OZ [in which Z is hydrogen or an aliphatic hydrocarbon side chain which may be substituted or is an unsubstituted or substituted aryl or aralkyl group, or is a group $CONY^1Y^2$ (in which $Y^1$ and $Y^2$ which may be the same or different are hydrogen atoms or unsubstituted or substituted alkyl groups)] or $R_1$ has one of the above stated meanings and $R_2$ is a group

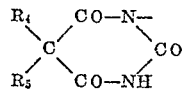

II in which $R_4$ and $R_5$ which may be the same or different and represent an unsubstituted or substituted aliphatic hydrocarbon side chain or an unsubstituted or substituted aryl, aralkyl or heterocyclic group and in which $R_3$ is halogen when $R_2$ is a group represented by general Formula II above in which $R^4$ and $R^5$ have the meaning stated or is, when $R_2$ is a halogen atom or a group OZ, a group represented by the general Formula II above in which $R_4$ and $R_5$ have the meanings stated, provided that the groups $R_4$ and $R_5$ are other than a phenyl and an ethyl group respectively when $R_1$ and $R_2$ are both hydroxyl groups.

Compounds of the above general Formula I which are particularly preferred because of their favourable activity and therapeutic ratio are those in which the group $R_3$ is a barbiturate group of general Formula II as defined above and $R_2$ is a hydroxyl group or, more preferably, a carbamyloxy group of general formula $O.CO.NY^1Y^2$ where $Y^1$ and $Y^2$ have the meanings given above. The substituents $Y^1$ and $Y^2$ are preferably hydrogen atoms.

Preferably in these compounds the group $R_1$ is an alkoxy group, preferably an alkoxy group containing from 1–10 carbon atoms, such as a methoxy, ethoxy, n- or iso propyloxy, butyloxy, amyloxy group or hexyloxy group; advantageously, $R_1$ can also be a alkenyloxy group, e.g. an allyloxy group, or can be an alkynyloxy group, e.g. a proparglyoxy group. The group $R_1$ can also, with advantage, be a halogen atom, for example a chlorine or bromine atom; it can also with advantage be a group $OCONY^1Y^2$ as above defined, in which both $Y^1$ and $Y^2$ are hydrogen atoms (that is a carbamyloxy group) or such a group in which either or both of the groups $Y^1$ and $Y^2$ are lower alkyl groups, for example methyl, ethyl, n-propyl and iso-propyl groups. The group $R_1$ can be a benzyloxy group or a group $—O(CH_2)_nOX$ in which $n$ is a whole number from 1–6 and X is a lower alkyl group.

Where the group $R_2$ is of general Formula II either or both of the groups $R_4$ and $R_5$ are preferably lower alkyl groups containing from 1–6 carbon atoms e.g. methyl, ethyl, n-propyl or iso-propyl groups or alkenyl groups e.g. allyl groups or are aryl groups, for example phenyl groups. Particularly preferred compounds are those in which both $R_4$ and $R_5$ are ethyl groups or allyl groups or in which $R_4$ is a phenyl group and $R_5$ is an ethyl group. Preferably, however, $R_2$ is a carbamyloxy group of formula $O.CONH_2$.

The group $R_3$ can with advantage be chlorine or bromine (when at least one of the groups $R_1$ and $R_2$ represents a group of general Formula II as above defined) or, preferably, a group of the general Formula II above, in which the groups $R_4$ and $R_5$ have the meaning specified as preferred groups in the preceding paragraph.

Specific preferred compounds according to the invention are set out below with reference to the following formula:

I

| $R_1$ | $R_2$ | $R_3$ |
|---|---|---|
| —OH | —OH or —OCONH₂ |  |
| —OCH₃ | —OH or —OCONH₂ |  |

| $R_1$ | $R_2$ | $R_3$ |
|---|---|---|
| $-OC_2H_5$ | $-OH$ or $-OCONH_2$ | $\begin{array}{c}C_6H_5\;\;CO-N\\ \diagdown\;\diagup\;\;\;\;\;\diagdown\\ C\;\;\;\;\;\;\;\;CO\\ \diagup\;\diagdown\;\;\;\;\;\diagup\\ C_2H_5\;\;CO-NH\end{array}$ |
| $-OC_3H_7$ (normal) | $-OH$ or $-OCONH_2$ | (same as above) |
| $-OC_3H_7$ (iso) | $-OH$ or $-OCONH_2$ | (same as above) |
| $-OC_4H_9$ (normal) | $-OH$ or $-OCONH_2$ | (same as above) |
| $-OC_4H_9$ (iso) | $-OH$ or $-OCONH_2$ | (same as above) |
| $-OC_5H_{11}$ (iso) | $-OH$ or $-OCONH_2$ | (same as above) |
| $-OC_5H_{11}$ (normal) | $-OH$ or $-OCONH_2$ | (same as above) |
| $-OC_6H_{13}$ | $-OH$ or $-OCONH_2$ | (same as above) |
| $-OCH_2CH=CH_2$ | $-OH$ or $-OCONH_2$ | (same as above) |
| $Cl$ | $-OH$ or $-OCONH_2$ | (same as above) |
| $-OC\equiv CH$ | $-OH$ or $-OCONH_2$ | (same as above) |
| $-O(CH_2)_2OC_2H_5$ | $-OH$ or $-OCONH_2$ | (same as above) |
| $-OCH_2C_6H_5$ | $-OH$ or $-OCONH_2$ | (same as above) |
| $-OC_6H_5$ | $-OH$ or $-OCONH_2$ | (same as above) |
| $-OCONH_2$ | $-OH$ or $-OCONH_2$ | (same as above) |
| $O.CO.NH_2$ | $\begin{array}{c}C_6H_5\;\;CO-N\\ \diagdown\;\diagup\;\;\;\;\;\diagdown\\ C\;\;\;\;\;\;\;\;CO\\ \diagup\;\diagdown\;\;\;\;\;\diagup\\ C_2H_5\;\;CO-NH\end{array}$ | $Br$. |

| R₁ | R₂ | R₃ |
|---|---|---|
| $OCH_3$ | $OCONH_2$ | $C_6H_5$\\C/$C_2H_5$ — CO—N(CO)(CO—NH) ring |
| $OCH_3$ | $OCONH_2$ | $CH_2=CH-CH_2$ / $CH_2=CH-CH_2$ barbiturate ring |
| $OCH_3$ | $OCON(C_2H_5)_2$ | $C_2H_5$ / $C_2H_5$ barbiturate ring |
| $OC_3H_7$ (iso) | $OCON(C_3H_7(iso))_2$ | $C_2H_5$ / $C_2H_5$ barbiturate ring |
| $OC_3H_7$ (iso) | $OCON(C_2H_5)_2$ | $C_2H_5$ / $C_2H_5$ barbiturate ring |

The preferred compound according to the invention is 5 - phenyl-5-ethyl-3-(β-carbamyloxy-γ-butoxypropyl)-barbituric acid.

According to the present invention we also provide dimeric compounds of the general formula

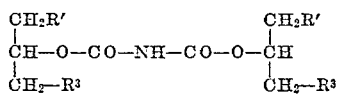

and

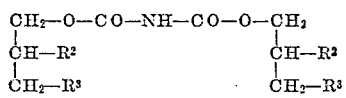

in which $R^1$, $R^2$ and $R^3$ have the above stated meanings. Such compounds possess therapeutic activity similar to that of the monomeric compounds described above.

The new dimeric compounds may be prepared by heating a compound of general Formula I in which $R^1$ or $R^2$ represents a group $O.CO.NY^1Y^2$, where $Y^1$ and $Y^2$ have the above stated meanings, at a high temperature for a prolonged period, for example 140° C. for several hours. It is possible, as in the monomeric compounds, to prepare a comparatively simple dimer possessing for example halogen or hydroxyl groups, and to introduce further groupings such as carbamyloxy and barbiturate groups after dimerisation.

A particularly useful member of the class of dimers according to the invention is the compound of formula

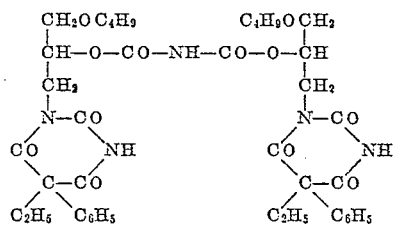

which possesses closely similar activity to that of the related monomer 5-phenyl-5-ethyl-3-(β-carbamyloxy-γ-butoxypropyl)-barbituric acid.

The compounds according to the present invention may be formulated in any convenient manner for administration and will usually be administered with a nontoxic pharmaceutical carrier. Thus, where the compounds are to be administered orally they may be given in admixture with an orally-ingestible pharmaceutical carrier, which carrier may be either liquid or solid. In the case of liquid preparations the carrier may be water and the composition may include other adjuvants such as dispersing and flavoring agents as well as other ingredients such as sweetening agents, e.g. sucrose, glucose or the like. The liquid preparations may also be administered in capsules and like unitary dosage units. Where the carrier is solid then the composition will preferably be in tablet or like unitary dose form, the carrier in this case being for example usual tablet base ingredients, and including disintegrating, dispersing and flavoring agents and other adjuvants, e.g. lactose, dextrin, starch, kaolin, talc, magnesium stearate, silica etc. For parenteral administration, the compounds may be formulated with a parenterally acceptable liquid carrier for example non-pyrogenic water, which may contain dispersing and wetting agents as desired.

Conveniently, the compounds according to the invention may be administered in the form of dosage units, each dosage unit containing a single daily dose or convenient fraction thereof. Thus, we have found that a convenient daily dose of the compounds according to the invention is from 50 to 500 mg. preferably 100 to 200 mg. Thus, therefore we find it convenient to prepare dosage units containing from 25 to 200 mg. preferably 50 to 100 mg. of the active compounds.

A preferred form of dosage unit is a tablet although capsules, cachets or like unitary dosage forms may be convenient.

The compounds of the present invention may be prepared in any suitable manner, it being convenient in some instances to prepare the more complex compounds according to the invention from the less complex compounds. In general, it is possible to prepare the new compounds by reacting a barbiturate salt with either a chlorhydrin having free hydroxyl groups which may subsequently be reacted further or with a derivative of such a chlorhydrin in which the hydroxyl groups have already been reacted.

According to a further feature of the invention, therefore, we provide a process for the preparation of the new compounds according to the invention in which a barbiturate compound of the general formula

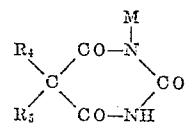

where M represents a metal atom and $R_4$ and $R_5$ have the meanings given above, is reacted with a halohydrin derivative of the general formula

in which $R_6$ is a halogen atom or a group OZ where Z has the meaning given above and $R_7$ is a halogen atom. Preferably, $R_7$ is a halogen atom and is replaced by the barbiturate group while $R_6$ is a group OZ. $R_6$ is preferably a hydroxyl group or a carbamyloxy group of the general formula $O.CO.NY^1Y^2$ where $Y^1$ and $Y^2$ have the meanings given above.

Where $R^1$ or $R^2$ is a hydroxyl or other replaceable group, this may then be replaced, for example by a carbamyloxy group.

Thus, for example, if one treats epichlorhydrin with an alcohol, for example according to the method of Fourneau and Ribas, the reaction generally taking place in the presence of a suitable condensation agent, such as concentrated sulphuric acid, one obtains a compound according to the invention of the general formula:

in which Z has the above stated meaning (other than hydrogen). This compound may then be further treated in a number of ways. Thus, by reaction of the compound with a further quantity of alcohol to replace the group —OH by a further group OZ in which Z has the above stated meaning one may obtain further compounds according to the invention. Thus, one may treat this compound to replace one or both groups —OH by a group $OCONY^1Y^2$ as above defined. This may be achieved where only one OH-group is present for example by reacting the compound with a carbonyl halide to obtain the corresponding acid halide, and then reacting the acid halide with a compound of the general formula $HNY^1Y^2$ (in which $Y^1$ and $Y^2$ have the above stated meanings). The halide is preferably a chloride and $HNY^1Y^2$ may be, for example, ammonia or a mono or dialkyl-amine. Alternatively, where either one or two OH-groups are present, one may react the compound of the general Formula III with a compound of the formula $XOCONY^1Y^2$ (in which X is a lower alkyl group) to effect replacement of the hydroxy group or the group OZ by a group $OCONY^1Y^2$. This reaction can conveniently be carried out in the presence of an aluminium alcoholate, for example aluminium isopropoxide.

It is further possible to react a haloformamide, preferably a chloroformamide, of general formula Halogen—$CO.NY^1Y^2$ (where $Y^1$ and $Y^2$ have the stated meanings) with a compound of general Formula III, preferably in the presence of a hydrogen halide acceptor.

The halohydrin derivative thus obtained by the above processes may then be reacted according to the invention with the barbiturate salt. It should be noted that when both $R_2$ and $R_3$ are halogen atoms a mixture of barbiturate derivatives will be formed which may then be separated e.g. by solubility or adsorption differences.

This reaction is preferably effected by simply heating the barbiturate salt and the halohydrin derivative together, if desired in the presence of an inert solvent. The purification of the reaction product is not, in general, easy but we have found that it may be made less difficult by carrying out the reaction in the absence of solvent and by treating the product first with water, which removes the metal halide salt and then with an organic solvent, preferably ether, in which the product is soluble. The organic solvent solution is then dried and the excess of the compound of general Formula I is distilled off. If the product which is left is subjected to fractional distillation at very low pressure and at a temperature below the decomposition temperature of the desired product, we have found that a separation of the desired product from the unreacted barbiturate of Formula IV may then readily be achieved.

It will thus be appreciated that the compounds of the present invention may be prepared by processes involving one or more steps which steps may follow in differing sequences. Thus, for example, starting from epichlorhydrin one may prepare the simpler compounds according to the invention by, for example, reaction with alcohols or phenols. One may then react the resulting compounds with a metal salt of a barbiturate, for example an alkali-metal derivative, to form a barbiturate derivative which derivative may then, if desired, be treated to replace either both or either of the remaining groups with a group $OCONY^1Y^2$ as above defined to form the carbamate or substituted carbamate derivatives for example by reaction with a carbonyl halide followed by treatment with a compound of the formula $HNY^1Y^2$, or by treatment with a compound of the formula $XOCONY^1Y^2$ (in which X is a lower alkyl group or halogen atom) as mentioned above. Alternatively, one can form the carbamate or substituted carbamate derivatives prior to formation of the barbiturate derivatives.

In order that the invention may be well understood the following examples are given by way of illustration only:

EXAMPLE 1

*(a) Preparation of 5-Phenyl-5-Ethyl-3-(β:γ-Dihydroxy-Propyl)-Barbituric Acid*

25.4 g. of phenobarbitone sodium are heated with 11 g. of glycerine chlorhydrin in 100 cc. of ethyl alcohol. Sodium chloride precipitates a little at a time and is recovered quantitatively at the end of the reaction which takes 4–6 hours. After filtering off the sodium chloride concentration is effected by evaporating off the alcohol. A brown mass is obtained which is very sticky and gummy and which melts easily on a water bath.

The crystallisation of the mass so obtained is difficult, the following procedure being adopted.

After the reaction product had been heated in vacuo at 150° C. for 1 hour to eliminate remaining traces of chlorhydrin, the gummy residue is dissolved in 25 cc. of boiling benzene. After leaving the solution in the refrigerator for about 24 hours there is obtained a mass which is triturated three times with cold benzene. The triturate is dried in vacuo and the resinous material is taken up in 20 cc. of ethyl alcohol and precipitated with dry ether. The precipitate is triturated again with 3.5 cc. portions of dry ether, taken up in ether, and precipitated with water. At this stage there is deposited a thick colourless oil which was subjected to analysis:

$C_{15}H_{17}O_5N_2$; molecular weight=305; N (calculated) =9.50%; N (found)=10.01%.

Distillation under ordinary reduced pressure being impossible, as the compound decomposes at 230° C., this oil was distilled using a diffusion pump giving a vacuum of 0.05 mm. The compound then distils easily at 200° C., without decomposition, as a colourless oil. Poured into a mortar it gives a breakable glass which when broken gives a powder having a melting point of 98° C. The yield is approximately 95%.

*Analysis.*—$C_{15}H_{17}O_5N_2$; M.W.: 305. Calculated: 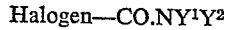 N=9.50%. Found: N=9.46%.

The same procedure has been applied to all the compounds the preparation of which is described below in the following examples, with, in general, good results. The yields have been found to be excellent. Distillation has, however, had to be repeated sometimes as many as (b) *5-Phenyl-5-Ethyl-3-(β:γ-Dihydroxy-Propyl)-Barbituric Acid Dicarbamate*

By the successive action of gaseous phosgene and gaseous ammonia on an ethereal solution of the compound prepared in (a) above a well crystallized white powder is obtained, which can be recrystallized from acetone, and which has a melting point of 80° C.

Analysis.—$C_{17}H_{21}O_7N_4$; M.W.: 393. Calculated: N=14.3%. Found: N=14.37%.

EXAMPLE 2

*5-Phenyl-5-Ethyl-3-(β-Hydroxy-γ-Methoxy-Propyl)-Barbituric Acid*

This compound may be prepared as in Example 1(a). This compound has the same adhesive properties as the compound prepared as in Example 1(a). By distillation under high vacuum, there is obtained a resin having a melting point of 37° C. and a boiling point of 205-210° C. (0.04 mm.). A yield of 93% is achieved.

Analysis.—$C_{16}H_{20}O_5N_2$; M.W.: 312. Calculated: N=9.0%. Found: N=9.24%.

EXAMPLE 3

*5-Phenyl-5-Ethyl-3-(β-Hydroxy-γ-Ethoxy-Propyl)-Barbituric Acid*

This compound may be prepared as in Example 1(a). The product obtained by distillation under high vacuum is a caky material. It boils at 196-202° C. (0.04 mm.), and is obtained in a yield of 72%.

Analysis.—$C_{17}H_{22}O_5N_2$; M.W.: 334. Calculated: N=8.4%. Found: N=8.48%.

EXAMPLE 4

*5-Phenyl-5-Ethyl-3-(β-Hydroxy-γ-n-Propyloxy-Propyl)-Barbituric Acid*

This substance, prepared as in Example 1(a), is a gummy colorless resin which distils at 198-200° C. under 0.03 mm. pressure. The yield is 60%.

Analysis.—$C_{18}H_{24}O_5N_2$; M.W.: 348. Calculated: N=8.05%. Found: N=8.07%.

EXAMPLE 5

*5-Phenyl-5-Ethyl-3-(β Hydroxy-γ-Isopropyloxy-Propyl)-Barbituric Acid*

This has the same appearance as the compound of Example 4 and distils at 190° C. under a pressure of 0.03 mm.

Yield obtained: 60%.

Analysis.—$C_{18}H_{24}O_5N_2$; M.W.: 348. Calculated: N=8.05%. Found: N=8.06%.

EXAMPLE 6

*5-Phenyl-5-Ethyl-3-(β-Hydroxy-γ-n-Butyloxy-Propyl)-Barbituric Acid*

This substance which has a boiling point of 203° C. (0.05 mm.), and has the appearance of a transparent sticky resin, is obtained in a yield of 84%.

Analysis.—$C_{19}H_{26}O_5N_2$; M.W.: 362. Calculated: N=7.4%. Found: N=7.75%.

EXAMPLE 7

*5-Phenyl-5-Ethyl-3-(β-Hydroxy-γ-Proparglyoxy-Propyl)-Barbituric Acid*

Distilled at 208° C. under 0.05 mm. pressure, this substance is obtained in a yield of 65%. It has the same gummy properties as the preceding compounds.

Analysis.—$C_{18}H_{20}O_5N_2$; M.W.: 344. Calculated: N=8.15%. Found: N=7.98%.

EXAMPLE 8

*5-Phenyl-5-Ethyl-3-(β-Hydroxy-γ-Ethoxyethyloxy-Propyl)-Barbituric Acid*

This substance has the same appearance as that of the preceding compounds. It distils at 210° C. (0.1 mm.). A yield of 70% is obtained.

Analysis.—$C_{19}H_{26}O_6N_2$; M.W.: 378. Calculated: N=7.4%. Found: N=7.01%.

EXAMPLE 9

*5-Phenyl-5-Ethyl-3-(β-Hydroxy-γ-Benzoyloxy)-Barbituric Acid*

This substance obtained is very sensitive to heating at high temperature. On distillation in vacuo a part of the product distils over between 220-225° C. at 0.05 mm. pressure. At 225° C. the substance decomposes. There results a brown solid breakable residue which is highly piezoelectric. The yield of pure substance is not more than 17%.

Analysis.—$C_{22}H_{24}O_5N_2$; M.W.: 396. Calculated: N=7.06%. Found: N=6.40%.

EXAMPLE 10

*5-Phenyl-5-Ethyl-3-(β-Hydroxy-γ-Phenoxy-Propyl)-Barbituric Acid*

This substance is obtained in the form of a clear yellow oil which is distilled in vacuo. The resulting product on cooling gives a white mass, which after breaking can easily be recrystallized from dilute alcohol. The powder obtained is piezoelectric and left in a flask it rapidly forms a single mass like a transparent glass.

Yield 75%; M.P. 63° C.

Analysis.—$C_{21}H_{22}O_5N_2$; M.W.: 382. Calculated: N=7.53%. Found: N=7.53%.

EXAMPLE 11

*Preparation of 5-Phenyl-5-Ethyl-3-(β-Carbamyloxy-γ-Butoxy-Propyl)-Barbituric Acid*

A. PREPARATION OF THE ACID CHLORIDE

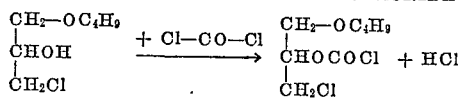

150 g. of β-hydroxy-α-butoxy-γ-chloropropane are mixed, at room temperature, with thorough stirring, with 170 g. of antipyrine base and 400 cc. of chloroform. To the solution obtained is added, with constant stirring 560 ml. of an approximately 20% solution of phosgene in toluene. The time of addition should be about 8 hours and the internal temperature should remain between 45-50° C. After this time, the chloroform is driven off and the antipyrine chlorhydrate formed removed by filtration. By removal of toluene there is obtained the crude acid chloride (approximately 200 g.) which is used for the next step in the preparation.

B. CARBAMATE OF β-HYDROXY-α-BUTOXY-γ-CHLOROPROPANE

In a 1-litre flask fitted with a stirrer, a reflux condenser and a gas-inlet tube, is placed about 200 g. of crude acid chloride and 800 ml. of benzene. The mixture is then heated under reflux for 12 hours, a brisk current of ammonia gas being passed through the mixture.

Ammonium chloride precipitates according to the equation:

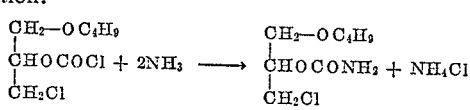

The lemon-yellow colour which indicates the end of the reaction then becomes apparent. The ammonium chloride is filtered off and the benzene distilled off. The desired carbamate is obtained which is recovered by distillation at reduced pressure at 160° C. at a pressure of 6 mm. It is a thick liquid which takes the form of a colourless and odourless oil which, on crystallisation possesses a melting point of 36.5° C.

C. PREPARATION OF BARBITURIC ACID DERIVATIVE 100 ml. of absolute alcohol are poured into a 500 ml. flask and 16 g. of sodium phenobarbitone added with stirring. The homogeneous suspension is heated under reflux and 12 g. of the carbamate prepared as in B above, together with 100 ml. of absolute alcohol is added drop by drop. Sodium chloride is deposited when the addition is complete. The precipitate is washed with alcohol, the alcoholic fractions are evaporated and heating of the oil is continued to complete the reaction. 300 ml. of distilled water are then added to wash out the excess of sodium phenobarbitone and the product is then purified by successive precipitation from the system dioxan-water.

Analysis.—$C_{20}H_{27}O_6N_3$; M.W.: 405. Calculated: N=10.33%. Found: N=10.33%.

If the above product is distilled under vacuum, a dimeric compound is obtained which distils at 230° C. at a pressure of 0.05 torr. This compound has a molecular weight 793 and analysis as follows:

N=9.00; C=60.65; H=6.73; M.W.: 793. $C_{40}H_{51}O_{12}N_5$ requires N=8.84; C=60.50; H=6.44.

This compound thus appears to possess the formula:

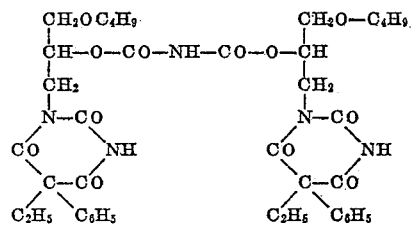

EXAMPLE 12

*Preparation of 5-Phenyl-5-Ethyl-3-(β-N-Diethyl-Carbamyl-γ-Methoxy-Propyl) Barbituric Acid*

A. N-DIETHYL-CHLOROFORMAMIDE

This is prepared by introducing at a low temperature 50 g. of diethylamine in 200 ml. of toluene, into 250 ml. of a 20% solution of phosgene in toluene. After removal of the chlorhydrate of the amine formed, the toluene is distilled and a product recovered which distils between 186 and 190° (20 torr).

B. THE N-DIETHYLCARBAMATE OF α-CHLORO-γ-METHOXY-PROPANOL-2

13.5 g. of N-diethylchloroformamide are mixed with 12.5 g. of α-chloro-γ-methoxypropanol-2 in the presence of a hydrogen chloride acceptor. By distillation in vacuo of the resulting substance one obtains an oil which distils between 99 and 104° (1 torr).

C. PREPARATION OF THE END PRODUCT

The substance prepared above is condensed as in the preceding examples with sodium phenobarbitone by heating in an ethanolic medium for 6 hours under reflux. After purification there is obtained a solid white crystalline substance which is slightly oily. It melts at 168° C.

Analysis.—$C_{21}H_{29}O_6N_3$; M.W.: 419. Calculated: N=10.01%. Found: N=10.10%.

EXAMPLE 13

*5-Phenyl-5-Ethyl-3-(β-Carbamyloxy-γ-Chloro-Propyl) Barbituric Acid*

The carbamate of β-hydroxy-α:γ-dichloropropane is prepared by a procedure analogous to that described for the preparation of the compound according to Example 11. This carbamate takes the form of a white powder which is readily melted on a water bath. The required quantity of sodium phenobarbitone is added to this melt and the mixture is heated on an oilbath at a temperature of 150° C. for about 8 hours until the reaction is complete.

There is then introduced, at that moment, with stirring, three times the quantity of distilled water necessary for the complete extraction of the excess of sodium phenobarbitone. The water is then removed, and the mixture distilled under very reduced pressure to recover the compound which distils at 225° C. under a pressure of 0.03 torr. The substance obtained crystallises into a brittle mass melting at 80° C.

Analysis.—$C_{16}H_{18}O_5N_3Cl$; M.W.: 367.5. N calculated: 11.42%. N found: 11.05%.

EXAMPLE 14

*5-Phenyl-5-Ethyl-3-(β-Diisopropylcarbamyloxy-γ-Isobutyloxy-Propyl) Barbituric Acid*

The N-diisopropylcarbamate of α-chloro-γ-isobutyloxy-propanol-2 (B.P. 102–104% 0.2 torr) is prepared by a procedure analogous to that for the preceding compound and is then condensed as in the preceding examples with sodium phenobarbitone to give the desired substance, which is a thick, colourless, odourless oil having no adhesive properties.

Analysis.—$C_{26}H_{39}O_6N_3$; M.W.: 489. Calculated: N=8.59%. Found: 8.50%.

I claim:

1. A compound selected from the group consisting of a compound of the formula

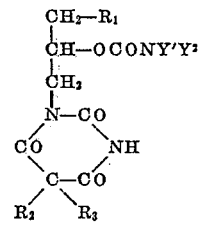

and a compound of the formula

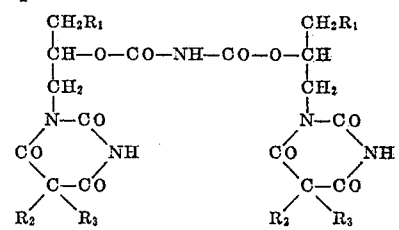

in which $R_1$ is a member selected from the group consisting of halogen, hydroxyl, lower alkenoxy, lower alkoxy, lower alkynyloxy, phenoxy, benzyloxy, carbamyloxy, mono-lower alkyl carbamyloxy and di-lower alkyl carbamyloxy, $R_2$ and $R_3$ are members selected from the group consisting of lower alkyl, lower alkenyl and phenyl and $Y^1$ and $Y^2$ are members selected from the group consisting of hydrogen and lower alkyl.

2. 5-phenyl-5-ethyl-3-(β-carbamyloxy-γ-butoxypropyl)-barbituric acid.

References Cited in the file of this patent

UNITED STATES PATENTS

| | | |
|---|---|---|
| 1,073,380 | Wolfes | Sept. 16, 1913 |
| 1,928,346 | Axelrod | Sept. 26, 1933 |
| 1,958,609 | Christiansen et al. | May 15, 1934 |
| 2,344,459 | Henze | Mar. 14, 1944 |
| 2,354,232 | Walter | July 25, 1944 |
| 2,594,309 | Hitchings et al. | Apr. 29, 1952 |
| 2,703,322 | Fox | Mar. 1, 1955 |
| 2,852,516 | Compte | Sept. 16, 1958 |
| 2,882,159 | Brooker et al. | Apr. 14, 1959 |

FOREIGN PATENTS

| | | |
|---|---|---|
| 62,460 | Switzerland | Dec. 10, 1912 |
| 63,942 | Switzerland | Dec. 10, 1912 |

OTHER REFERENCES

Dox et al.: J. Am. Chem. Soc., 51, pages 316–318 (1929).